United States Patent [19]
O'Brien et al.

[11] Patent Number: 5,302,442
[45] Date of Patent: Apr. 12, 1994

[54] HEAT SEALABLE BASE FILMS

[75] Inventors: Jeffrey J. O'Brien, Walworth; Donald F. Sexton, Fairport, both of N.Y.

[73] Assignee: Mobil Oil Corporation, Fairfax, Va.

[21] Appl. No.: 9,161

[22] Filed: Jan. 26, 1993

Related U.S. Application Data

[63] Continuation-in-part of Ser. No. 848,450, Mar. 9, 1992, abandoned.

[51] Int. Cl.$^5$ .............................................. B32B 7/02
[52] U.S. Cl. .................................. 428/213; 428/349; 428/516; 428/910; 525/240
[58] Field of Search ................. 428/516, 349; 525/240

[56] References Cited

U.S. PATENT DOCUMENTS

| | | | |
|---|---|---|---|
| 4,870,122 | 9/1989 | Lu | 524/488 |
| 4,916,025 | 4/1990 | Lu | 428/516 |

*Primary Examiner*—Edith Buffalow
*Attorney, Agent, or Firm*—Alexander J. McKillop; Dennis P. Santini; Laurence P. Hobbes

[57] ABSTRACT

A base thermoplastic film, has a coextruded or coated heat seal layer formed from a polymer blend which provides good peel-apart heat seals. When the film is sealed to itself, the seal opens by separation at the original seal surface without film tear, or by delamination of the sealant material from the primary base film substrate without the formation of strands extending between the two base film. The heat seal layer which may be on one or both sides of the base layer comprises a ternary blend of a random ethylene-propylene copolymer, a butene polymer and a low density polyethylene.

The films are cast, and oriented in the solid state up to about two times in the machine direction and six times or more in the transverse direction to give films having good dead-fold and water vapor transmission rate characteristics making them highly suited for packaging, particularly for dry foods.

18 Claims, No Drawings

HEAT SEALABLE BASE FILMS

This application is a continuation-in-part of Ser. No. 07/848,450, filed Mar. 9, 1992 now abandoned.

FIELD OF THE INVENTION

This invention relates to heat sealable thermoplastic substrate films and more particularly to heat sealable films of oriented or nonoriented polymer films.

BACKGROUND OF THE INVENTION

Thermoplastic films employed for packaging, if not barrier coated, tend to transmit oxygen or unpleasant odors which leads to product deterioration which in either case affects the palatability of the product. An effective barrier coating is not usually effective as a heat-seal coating. Some have no heat-seal characteristics and others are so aggressive that on attempting to unseal such a package, the package is largely destroyed. With films that are unoriented or oriented to unbalanced extent, during separation of a sealed region, the films will tend to tear in the direction of least orientation. An ideal barrier layer coated film, therefore, is one which effectively minimizes the transmission of oxygen, moisture, odors, etc., while at the same time permitting an effective heat seal between films and permitting the seal to be easily peeled apart without destroying the body of the package.

It is an object of the present invention to provide such a barrier layer coated, heat-sealable film, which film when heat-sealed is readily peeled apart at the heat seal.

SUMMARY OF THE INVENTION

There has now been discovered a barrier layer coated film which can be heat-sealed effectively and yet unsealed by hand-force when desired. The film comprises a thermoplastic substrate coated with a ternary blend comprising a random ethylene-propylene polymer, a butene polymer and a low density polyethylene polymer. When the film is sealed to itself, the seal opens by separation at the original seal surface without film tear, or by delamination of the sealant material from the film substrate without the formation of strands of sealant extending between substrate surfaces.

DETAILED DESCRIPTION

The contemplated substrates include polyethylene, polypropylene, polyester films, such as polyethylene terephthalate films, polyamide films, such as the nylons, etc. Polyethylene will be employed as exemplary of the contemplated films. While a high density polyethylene (HDPE) film will be used, it is also understood that, low density, medium density, linear low density polyethylenes and mixtures thereof may also be used.

The heat seal compositions used on the HDPE base films comprise blends of three components which are formulated to ensure that each component is present in an amount which effectively interferes with the seal strength development of any other single component: a controlled seal strength is generated by the interaction of the three components, resulting in a heat seal which is strong enough to provide an adequate seal which can, however, be peeled apart without tearing the base film. Seal strengths of 100 to 500 grams per inch which permit ready peel-apart separation can be obtained with seal temperatures in the range of about 170° to about 250° F. (measured with a WrapAide Crimp Sealer run at 20 psi, 0.75 second dwell time). In commercial operation, sealing may be successfully achieved over a wide range of temperatures suitable for commercial equipment while retaining the desired peel separation characteristics.

The sealant blends are composed of at least one component from each of the three groups (A, B, C) below.

The Group A polymeric component is a random ethylene-propylene copolymer. This may be derived from ethylene and one or more co-monomers. The propylene content of these random copolymers is typically from about 70 to 85 weight percent, more usually from about 75 to 85 percent, with the balance of ethylene and any other comonomers such as butylene. Suitable copolymers of this type are random copolymers of ethylene and propylene or random terpolymers of ethylene, propylene and butene. Preferred copolymers of this type include the following:

Ethylene-propylene copolymers containing 2–10 weight percent random ethylene, e.g. 3–7 weight percent ethylene.

Ethylene-propylene-butene random terpolymers containing 1–5 weight percent random ethylene, 10–25 weight percent random butene. The amounts of the random ethylene and butene components in these copolymers are typically in the range of 10 to 25 percent total (ethylene plus butene). Typical terpolymers of this type include those with about 1–5 percent ethylene and 10–25 percent butene.

These copolymers typically have a melt flow rate in the range of about 5 to 10 with a density of about 0.9 and a melting point in the range of about 115° to about 130° C.

The Group B polymer component is a butene polymer which may be a homopolymer or copolymer with minor amounts of comonomers such as ethylene and/or propylene. These butene polymers typically have a molecular weight of at least 10,000 and a melt index from 1 to 6, usually about 2 to 4.

The Group C polymer component comprises a low density polyethylene. This may be a linear low density polyethylene (LLDPE) or a non-linear polyethylene. These polymers typically have a melt index of 1 to 5. The low density polyethylenes should have a density of 0.88 to 0.93 while the linear materials may have a density as high as 0.94, usually in the range 0.90–0.94, e.g. 0.918 or 0.921, with a melt index from about 1 to about 5. The linear low density polyethylenes may be derived from ethylene together with other higher comonomers such as hexene-1 or octene-1.

The three components of the composition are used in a blend which is formulated to provide a seal strength of 100 to 500 grams/inch (measured with a WrapAide at a seal temperature of 170° to 250° F., at 20 psi and a dwell time of 0.75 seconds). The best results are obtained when the three components are in approximate balance with one another, i.e. with no more than 50 weight percent of the total blend from one component. This implies that each component will be present in an amount from about 10 to 50 weight percent, usually 15 to 45, typically 20 to 40, weight percent of the total blend. As shown below, blends which contain about 20 weight percent of one of the three components with the balance made up of equal amounts of the other two components, give very favorable results.

The polymer components of all three groups may contain stabilizers to minimize oxidative and thermal degradation, as well as other additives to achieve other functionality including, but not limited to, static reduction, ease of processing, ink receptivity etc. Silicone oil may be added, e.g. in amounts from about 0.2 to 2 weight percent to improve slip characteristics and ease of processing; polydimethylsiloxane is preferred for this purpose. Wax, preferably Fischer-Tropsch or microcrystalline wax, may be added to the blends in an amount typically up to about 10 weight percent for improved WVTR performance.

The heat seal compositions are used on base films which have been biaxially oriented to provide good WVTR properties as well as other characteristics which are desirable in packaging films. The seal blends may be used on one or both sides of the base films.

For example, HDPE base layers are biaxially oriented in an imbalanced manner to a degree of 1.1:1 to about 2:1, usually from about 1.25:1 to 2:1, in the machine direction (MD), and to a degree of about 6:1 to about 12:1 in the transverse direction (TD). These films have reduced water vapor transmission (WVTR), improved dead-fold, and other physical properties which are markedly better than blown HDPE films, even when the total film thickness is reduced to less than about 1 or 2 mils. When provided with a blended heat-seal layer of the ethylene-propylene random copolymers the films are particularly suited for use in packaging, especially of dry foodstuffs. The films may be used in a wide variety of packaging equipment including vertical form, fill and seal (VFFS) and high speed horizontal slug wrapping machines.

These imbalanced biaxially oriented films are made using a major proportion of a high density polyethylene (HDPE) having a density of at least 0.96. The film can be composed exclusively of a single HDPE resin, a mixture of HDPE resins, or of HDPE containing a minor proportion of other resource polymers. These high density polyethylenes typically have a melt index from about 0.5 to about 10, usually from about 0.7 to 2. The mixture of HDPE resins gives better processing characteristics in the extruder by reducing extruder torque. Films made with a blend of HDPE resins reduce splittiness of the film which manifests itself as the tendency of the film to break in the TD direction during operation on vertical, form, fill and seal (VFFS) machinery.

The blends of HDPE polymers can comprise two or more polymers all of which preferably have densities of 0.96 or greater. Blends of HDPE polymers advantageously comprise a major proportion of HDPE having a melt index of 0.5 to 6 and one or more polymers having a different melt index.

Terblends have been found particularly desirable. Suitable terblends generally comprise 50 to 98 weight percent, preferably 84 to 96 weight percent of HDPE having a density of 0.96 or higher and a melt index of greater than 0.5 to about 1.0; 1 to 25 weight percent, preferably 3 to 8 weight percent of HDPE having a density of 0.96 or greater and a melt index of 0.1 to 0.5; and 1 to 25 weight percent, preferably 3 to 8 weight percent, of HDPE having a density of 0.96 or higher and a melt index of greater than 2 to about 8. Preferably, the second and third HDPE polymers which are minor components are present in about equal amounts.

The heat seal layer can be applied to the selected base film in any conventional manner, for example, by coating or coextrusion before orientation or by coating the film after one or both of the biaxial orientation operations.

The base films of this invention can include other polymer layers in addition to the heat seal layer, for example, polymers having barrier properties for gases such as oxygen.

The proper degree of orientation in the film provides the desired physical properties, as well as good WVTR and dead-fold characteristics. For example, it has been determined that films with a thickness of 1.4 to 4 mils will have acceptable WVTR (g-mil/100 in$^2$/24 hr—1 atm) of less than about 0.2/mil whereas a somewhat heavier gauge (1.5 times thicker or more) is needed in a blown HDPE film to achieve the same WVTR. The benefits of reduced WVTR are due to the improvements obtained by biaxial orientation below the HDPE melting point. Although higher density HDPE resin having a density of 0.957 or greater can be made directly into thin films by cast extrusion, problems of curling, uniformity, flatness and high WVTR remain as obstacles.

Accordingly, thin HDPE films of about 0.8 to 1.5 mils having the best balance of properties, particularly for VFFS applications, are obtained with imbalanced biaxially oriented films prepared from films having a cast gauge of 12 to 20 mils reduced to the desired gauge by orientation. The final film gauge will typically be not more than about 2.5 mils.

The films may be produced and oriented in the conventional manner. When the heat sealable layer is present on one or both sides of the HDPE film, cast extrusion is generally accomplished using a multi-roll stand system having three or more rolls.

In the usual manner the film is heated to its orientation temperature and first subjected to MD orientation between two sets of nip rolls the second rotating at a greater speed than the first in an amount equal to the desired draw ratio. Then the film is TD oriented by heating and subjecting it to transverse stretching in a tenter frame. Typically MD orientation is conducted at 60° to 120° C. and TD orientation at 110° to 145° C.

The invention is illustrated by the following non-limiting examples in which all parts are by weight unless otherwise specified.

EXAMPLES 1–3

These examples used a heat seal blend comprised of: a random ethylene, propylene, butene-1 terpolymer with a weight ratio of 1.5–3% ethylene and 12–18% butene-1, a low density polyethylene (LDPE) with a density of 0.92 and a melt index of 2.2, and a polybutene-1 (PB) with a melt index of 4.

The amounts of the blend components were varied as shown below:

| Blend Component | Terpolymer | LDPE | PB |
| --- | --- | --- | --- |
| Example 1 | 20 | 40 | 40 |
| Example 2 | 40 | 20 | 40 |
| Example 3 | 40 | 40 | 20 |

Two layer biaxially oriented films having final thicknesses in the range of 0.4 to 5 mils were prepared by coextruding a primary HDPE layer comprising 90% of the film thickness with the sealant layer. The primary layer HDPE had a broad molecular weight distribution and a density of 0.96 with a melt index of about 1.

The films were prepared in a three roll stack system. The films were then oriented 1.3 times in the MD at about 115° C., and 10 times in the TD direction 115°–160° C. in a tenter frame.

The films were run on a horizontal wrapping machine producing slugs of wrapped crackers. They performed well in crimp sealing at the temperatures shown below, providing seal strengths of 100–500 grams per inch, with seals peeling open without tearing the film.

|           | Seal Temperature, °F. | WrapAide*, °F. |
|-----------|-----------------------|----------------|
| Example 1 | 200–300               | 170–240        |
| Example 2 | 200–290               | 170–230        |
| Example 3 | 200–280               | 180–230        |

*20 psi, 0.75 sec. dwell time

The WVTR in all cases was 0.18–0.22 g-mil/100 in$^2$/24 hr at 1 atmosphere.

EXAMPLES 4–6

These examples used a heat seal blend comprised of:
a random ethylene-propylene copolymer containing 4–8% random ethylene,
a low density polyethylene (LDPE) with a density of 0.92 and a melt index of 2.2, and
a polybutene-1 (PB) with a melt index of 2.

The amounts of the blend components were varied as shown below:

| Blend Component | Copolymer | LDPE | PB |
|-----------------|-----------|------|-----|
| Example 4       | 20        | 40   | 40  |
| Example 5       | 40        | 20   | 40  |
| Example 6       | 40        | 40   | 20  |

A two layer biaxially oriented film having a final thickness of 1.15 mils was prepared by coextruding a primary HDPE layer comprising 90% of the film thickness with the sealant layer. The primary layer HDPE had a broad molecular weight distribution and a density of 0.96 with a melt index of 1.

The films were prepared in a three roll stack system. The films were then oriented 1.3 times in the MD at about 115° C., and 10 times in the TD direction 115°–160° C. in a tenter frame.

The films were run on a horizontal wrapping machine producing slugs of wrapped crackers. They performed well in crimp sealing at the temperatures shown below, providing seal strengths of 100–500 grams per inch, with seals peeling open without tearing the film.

|           | Seal Temperature, °F. | WrapAide, °F.* |
|-----------|-----------------------|----------------|
| Example 4 | 220–280               | 180–230        |
| Example 5 | 220–270               | 180–200        |
| Example 6 | 220–300               | 180–230        |

*20 psi, 0.75 sec. dwell time

The WVTR in all cases was 0.18–0.22 g-mil/100 in$^2$/24 hr at 1 atmosphere.

EXAMPLES 7–9

These examples used a heat seal blend comprised of:
a random ethylene, propylene, butene-1 terpolymer with
a weight ratio of 1–2% ethylene and 20–25% butene-1,
a linear low density polyethylene (LLDPE) with a density of 0.92 and a melt index of 2.2, and
a polybutene-1 (PB) with a melt index of 4.

The amounts of the blend components were varied as shown below:

| Blend Component | Copolymer | LLDPE | PB |
|-----------------|-----------|-------|-----|
| Example 7       | 20        | 40    | 40  |
| Example 8       | 40        | 20    | 40  |
| Example 9       | 40        | 40    | 20  |

Two layer biaxially oriented films having final thicknesses in the range of 0.4–5 mils were prepared by coextruding a primary HDPE layer comprising 90% of the film thickness with the sealant layer. The primary layer HDPE had a broad molecular weight distribution and a density of 0.96 with a melt index of 2.

The films were prepared in a three roll stack system. The films were then oriented 1.3 times in the MD at about 115° C., and 10 times in the TD direction 115°–160° C. in a tenter frame.

The films were run on a horizontal wrapping machine producing slugs of wrapped crackers. The performed well in crimp sealing at the temperatures shown below, providing seal strengths of 100–500 grams per inch, with seals peeling open without tearing the film.

|           | Seal Temperature, °F. | WrapAide*, °F. |
|-----------|-----------------------|----------------|
| Example 7 | 230–280               | 180–240        |
| Example 8 | 200–270               | 180–220        |
| Example 9 | 230–300               | 190–240        |

*WrapAide 20 psi, 0.75 sec. dwell time

The WVTR in all cases was 0.18–0.22 g-mil/100 in$^2$/24 hr at 1 atmosphere.

EXAMPLES 10–11

These examples used a heat seal blend comprised of:
a random ethylene, propylene, butene-1 terpolymer with a weight ratio of 1.5–3% ethylene and 12–18% butene-1,
a low density polyethylene (LDPE) with a density of 0.92 and a melt index of 2.2, and
a polybutene-1 (PB) with a melt index of 4.

The amounts of the blend components were varied as shown below:

| Blend Component | Copolymer | LLDPE | PB |
|-----------------|-----------|-------|-----|
| Example 10      | 60        | 20    | 20  |
| Example 11      | 40        | 0     | 40  |

Two layer biaxially oriented films having final thicknesses of in the range of 0.4–5 mils were prepared by coextruding a primary HDPE layer comprising 90% of the film thickness with the sealant layer. The primary layer HDPE had a broad molecular weight distribution and a density of 0.96 with a melt index of 1.

The films were prepared in a three roll stack system. The films were then oriented 1.3 times in the MD at about 115° C., and 10 times in the TD direction 115°–160° C. in a tenter frame.

The WVTR in all cases was 0.18–0.22 g-mil/100 in$^2$/24 hr at 1 atmosphere.

The films were run on a horizontal wrapping machine producing slugs of wrapped crackers. The films of Example 10 performed well in crimp sealing temperatures of 200°–210° F. (170–190 on the WrapAide at 20 psi, 0.75 sec. dwell time), providing seal strengths of 100-400 g./in but the temperature range is too narrow for commercial operation (a minimum 30° F. range, and preferably 40° F., is desired for commercial operation). At higher seal temperatures above 20° F., seal strength increased to values of 400-1,000 grams per inch, and the base film tore when the packages were opened.

As indicated above, HDPE can be replaced by any of the base films disclosed above.

The films of Example 11 performed well at crimp sealing temperatures of 200°-210° F. (170-190 on the WrapAide at 20 psi, 0.75 sec. dwell time), providing seal strengths of 100-400 g./in but the temperature range is too narrow for commercial operation. At higher seal temperatures, seal strength increased to values of 400-900 grams per inch, and the base film tore when the packages were opened.

What is claimed is:

1. A film structure comprising a thermoplastic film oriented or unoriented having a heat sealable layer on at least one side thereof which on heat sealing under the conditions of 170°-250° F., 20 psi and for sufficient time to effect a seal which can be opened by separation at the original seal surface without film tear or by delamination of the sealant material from the base layer, said sealable layer comprising a blend of (1) from about 10 to about 50% by weight of a random terpolymer of ethylene, propylene and butene, (2) from about 10 to about 50% of low density polyethylene, and (3) from about 10 to about 50% of polybutene.

2. The film of claim 1 in which the heat seal has a seal strength of 100 to 500 grams per inch.

3. The film of claim 2 in which the heat sealable layer comprises a blend of from about 10 to about 50% of a random terpolymer of ethylene, propylene and butene, from about 10 to about 50% of low density polyethylene and from about 10 to about 50% of polybutene.

4. The film of claim 3 in which the heat sealable layer comprises a blend of from about 30 to about 50% of the random terpolymer of ethylene, propylene and butene, from about 10 to about 30% of low density polyethylene and from about 10 to about 30% of polybutene.

5. The film of claim 4 in which the heat sealable layer comprises a blend of from about 10 to about 30% of the random terpolymer of ethylene, propylene and butene, from about 30 to about 50% of low density polyethylene and from about 10 to about 30% of polybutene.

6. The film of claim 4 in which the heat sealable layer comprises a blend of from about 10 to about 30% of the random terpolymer of ethylene, propylene and butene, from about 10 to about 30% of low density polyethylene and from about 30 to about 50% of polybutene.

7. The film of claim 2 in which the low density polyethylene component is a linear low density polyethylene.

8. The film of claim 1 wherein the base film is a member selected from the group consisting of a film of polyethylene, polypropylene, polyester polyamide and mixtures thereof.

9. The film of claim 8 in which the base layer comprises an HDPE blend of two or more polymers each of which has a density of 0.96 or greater.

10. The film of claim 9 in which the HDPE blend comprises a major proportion of HDPE having a melt index of 0.5 to 10.

11. The film of claim 9 in which the HDPE blend comprises a terblend of 50 to 98 weight percent of HDPE having a density of 0.96 or higher and a melt index of greater than 0.5 to about 2; 1 to 25 weight percent, of HDPE having a density of 0.96 or greater and a melt index of 0.1 to 0.5; and 1 to 25 weight percent, of HDPE having a density of 0.96 or higher and a melt index of greater than 2 to about 8.

12. The film of claim 11 in which the HDPE blend comprises a terblend of 84 to 96 weight percent of HDPE having a density of 0.96 or higher and a melt index of greater than 0.5 to about 2; 3 to 8 weight percent, of HDPE having a density of 0.96 or greater and a melt index of 0.1 to 0.5; and 3 to 8 weight percent, of HDPE having a density of 0.96 or higher and a melt index of greater than 2 to about 8.

13. The film of claim 1 which has a thickness of not more than 2.5 mils.

14. A heat seal composition for oriented films which comprises a blend of from about 10 to about 50% of a random copolymer of ethylene and propylene, from about 10 to about 50% of low density polyethylene and from about 10 to about 50% of polybutene.

15. The composition of claim 14 in which the random coplymer of ethylene and propylene comprises a random copolymer of ethylene and propylene or a random terpolymer of ethylene, propylene and butylene.

16. The composition of claim 15 in which blend comprises from about 30 to about 50% of the random copolymer of ethylene and propylene or the random terpolymer of ethylene, propylene and butylene, from about 10 to about 30% of low density polyethylene and from about 10 to about 30% of polybutene.

17. The composition of claim 15 in which the blend comprises from about 10 to about 30% of the random copolymer of ethylene and propylene or the random terpolymer of ethylene, propylene and butylene, from about 30 to about 50% of low density polyethylene and from about 10 to about 30% of polybutene.

18. The composition of claim 15 in which the heat sealable layer comprises a blend of from about 10 to about 30% of the random copolymer of ethylene and propylene or the random terpolymer of ethylene, propylene and butylene, from about 10 to about 30% of low density polyethylene and from about 30 to about 50% of polybutene.

* * * * *